(12) United States Patent
Hugill et al.

(10) Patent No.: US 7,730,047 B2
(45) Date of Patent: Jun. 1, 2010

(54) ANALYSIS OF MEDIA CONTENT VIA EXTENSIBLE OBJECT

(75) Inventors: Christopher Michael Hugill, Woodinville, WA (US); Andrew D. Kutruff, Seattle, WA (US); Michael J. Patten, Sammamish, WA (US); Randolph Bruce Oakley, Bellevue, WA (US); Richard J. Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 11/400,141

(22) Filed: Apr. 7, 2006

(65) Prior Publication Data

US 2007/0239779 A1 Oct. 11, 2007

(51) Int. Cl.
*G06F 17/30* (2006.01)
*G06F 17/00* (2006.01)

(52) U.S. Cl. ..................... 707/705; 707/821

(58) Field of Classification Search ............ None
See application file for complete search history.

(56) References Cited

U.S. PATENT DOCUMENTS

| | | | |
|---|---|---|---|
| 5,134,661 A | | 7/1992 | Reinsch |
| 5,893,095 A * | | 4/1999 | Jain et al. ............ 707/6 |
| 6,369,835 B1 | | 4/2002 | Lin |
| 6,463,444 B1 * | | 10/2002 | Jain et al. ............ 707/104.1 |
| 6,469,711 B2 | | 10/2002 | Foreman et al. |
| 6,628,710 B1 * | | 9/2003 | Llach-Pinsach et al. 375/240.08 |
| 6,721,361 B1 | | 4/2004 | Covell et al. |
| 6,833,865 B1 | | 12/2004 | Fuller et al. |
| 6,877,134 B1 | | 4/2005 | Fuller et al. |
| 6,928,613 B1 | | 8/2005 | Ishii et al. |
| 7,096,481 B1 * | | 8/2006 | Forecast et al. ............ 725/32 |
| 7,124,366 B2 | | 10/2006 | Foreman et al. |
| 7,260,564 B1 * | | 8/2007 | Lynn et al. ............ 707/3 |
| 2001/0003468 A1 | | 6/2001 | Hampapur et al. |
| 2003/0185296 A1 | | 10/2003 | Masten, Jr. |
| 2004/0183951 A1 | | 9/2004 | Lee |
| 2004/0230655 A1 | | 11/2004 | Li et al. |
| 2005/0033760 A1 | | 2/2005 | Fuller et al. |
| 2005/0223799 A1 | | 10/2005 | Murphy |
| 2005/0271279 A1 | | 12/2005 | Fujimura et al. |
| 2005/0280707 A1 | | 12/2005 | Sablak et al. |
| 2005/0286863 A1 | | 12/2005 | Howarth |
| 2006/0005136 A1 | | 1/2006 | Wallick et al. |

(Continued)

FOREIGN PATENT DOCUMENTS

WO WO 00/39997 7/2000

OTHER PUBLICATIONS

Chen, et al., "Action Movies Segmentation and Summarization Based on Tempo Analysis," 2004, pp. 251-258, http://delivery.acm.org/10.1145/1030000/1026752/p251-chen.pdf?key1=1026752&key2=0270047311&coll=GUIDE&dl=GUIDE&CFID=62554806&CFTOKEN=51768746.

(Continued)

*Primary Examiner*—Yicun Wu
(74) *Attorney, Agent, or Firm*—Senniger Powers LLP

(57) ABSTRACT

A system and method are provided for analyzing media content and generating related metadata as it is provided to a computer. In one embodiment, the system includes an extensible analysis object managing a plurality of plug-ins for analyzing the media content and generating metadata related to the media content.

18 Claims, 3 Drawing Sheets

U.S. PATENT DOCUMENTS

2007/0218448 A1  9/2007  Harmeyer et al.

OTHER PUBLICATIONS

Laws, et al., "Using Digital Video Analysis in Introductory Mechanics Projects," The Physics Teacher, vol. 36, May 1998, pp. 282-287, http://physics.dickinson.edu/~dept_web/activities/papers/VideoAnalysis.pdf.

Doermann, et al., "Progress in Camera-Based Document Image Analysis," 2003 IEEE, 11 pages, http://ieeexplore.ieee.org/search/srchabstract.jsp?arnumber=1227735&isnumber=27545&punumber=8701&k2dockey=1227735@ieeecnfs&query=%28+%28+%28video+or+movei%29+and+%28capture+and+analy*%29%3Cin%3Eti+%29+%3Cor%3E+%28+%28video+or+movei%29+and+%28capture+and+analy*%29%3Cin%3Eab+%29+%29&pos=0.

Nishizaki, et al., "Video Quality Analysis for an Automated Video Capturing and Editing System for Conversation Scenes," 2005 IEEE, 4 pages, http://ieeexplore.ieee.org/search/srchabstract.jsp?arnumber=1521514&isnumber=32544&punumber=10203&k2dockey=1521514@ieeecnfs&query=%28+%28+%28video+or+movei%29+and+%28capture+and+analy*%29%3Cin%3Eti+%29+%3Cor%3E+%28+%28video+or+movei%29+and+%28capture+and+analy*%29%3Cin%3Eab+%29+%29&pos=6.

\* cited by examiner

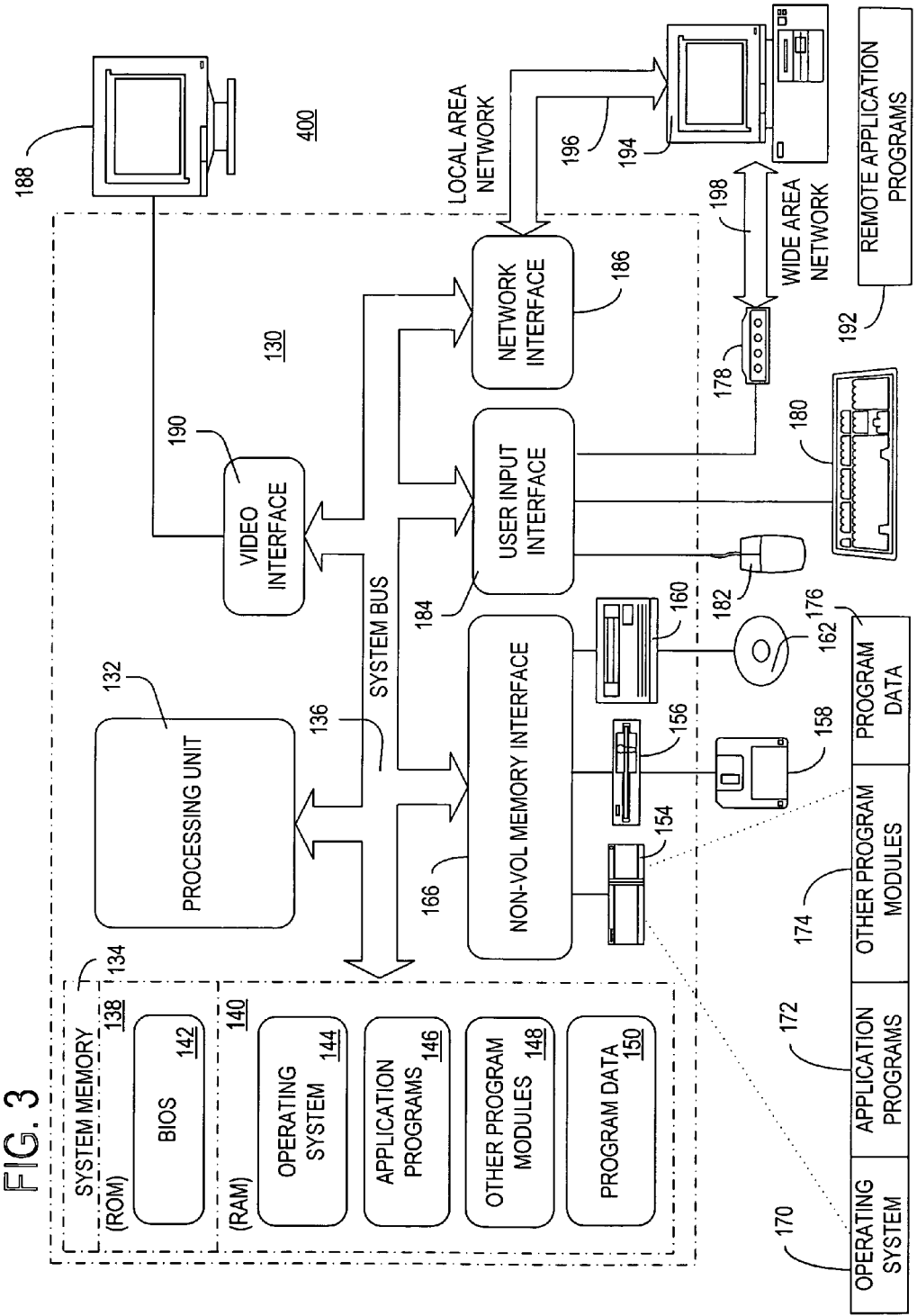

ANALYSIS OF MEDIA CONTENT VIA EXTENSIBLE OBJECT

BACKGROUND

Capturing video includes the process of transferring media content from a recording device such as a digital video camcorder to a computer. A user is required to capture video in order to edit the media content of the video with a computer non-linear video editing system, or to store the media content on a computer. Recording devices (e.g., digital video camcorders) may have any number of memory systems with a common one being a tape based memory system. Capturing from tape based recording devices is a real-time process such that capturing 1 hour of video to a computer requires approximately 1 hour of time. Other types of recording devices (e.g., flash based memory, optical drive based memory, or magnetic drive based memory) have similar requirements.

Video capture applications typically allow the user to preview the media content while it is being captured. For example, the media content is stored on a recording device in the form of a DV-AVI video clip or MPEG-2 video clip. In order for a user to preview the media content as it is streamed to the computer, video capture applications must decode the video clip from its native format into an uncompressed format as it is received.

Users are required to manually apply processes to generate metadata, correct and enhance the video after completing the capture of the media content to the computer. Additionally, the generated metadata is stored in a location defined by the process generating the metadata. Since metadata generating applications are made by a number of different developers, there exists no common location and format of metadata generated for any given video clip. Thus, it is difficult for an application produced by one developer to use or even access metadata generated by an application produced by another developer.

SUMMARY

Embodiments of the invention include a system for analyzing media content, generating metadata related to the media content, and for storing the media content and metadata in a media file. The metadata is generated by at least one analysis object of a plurality of analysis objects which analyzes the media content and stores metadata to a metadata queue. Additional analysis objects are added to the system by interfacing an application programming interface (API) of the system. Thus, the metadata is stored in a consistent format and location such that any application can access the metadata, additional analysis tools can be easily added to the system, and metadata is associated with the media content it relates to.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is a block diagram illustrating one example of a suitable computing system environment in which the invention may be implemented.

Corresponding reference characters indicate corresponding parts throughout the drawings.

DETAILED DESCRIPTION

Figure 1:
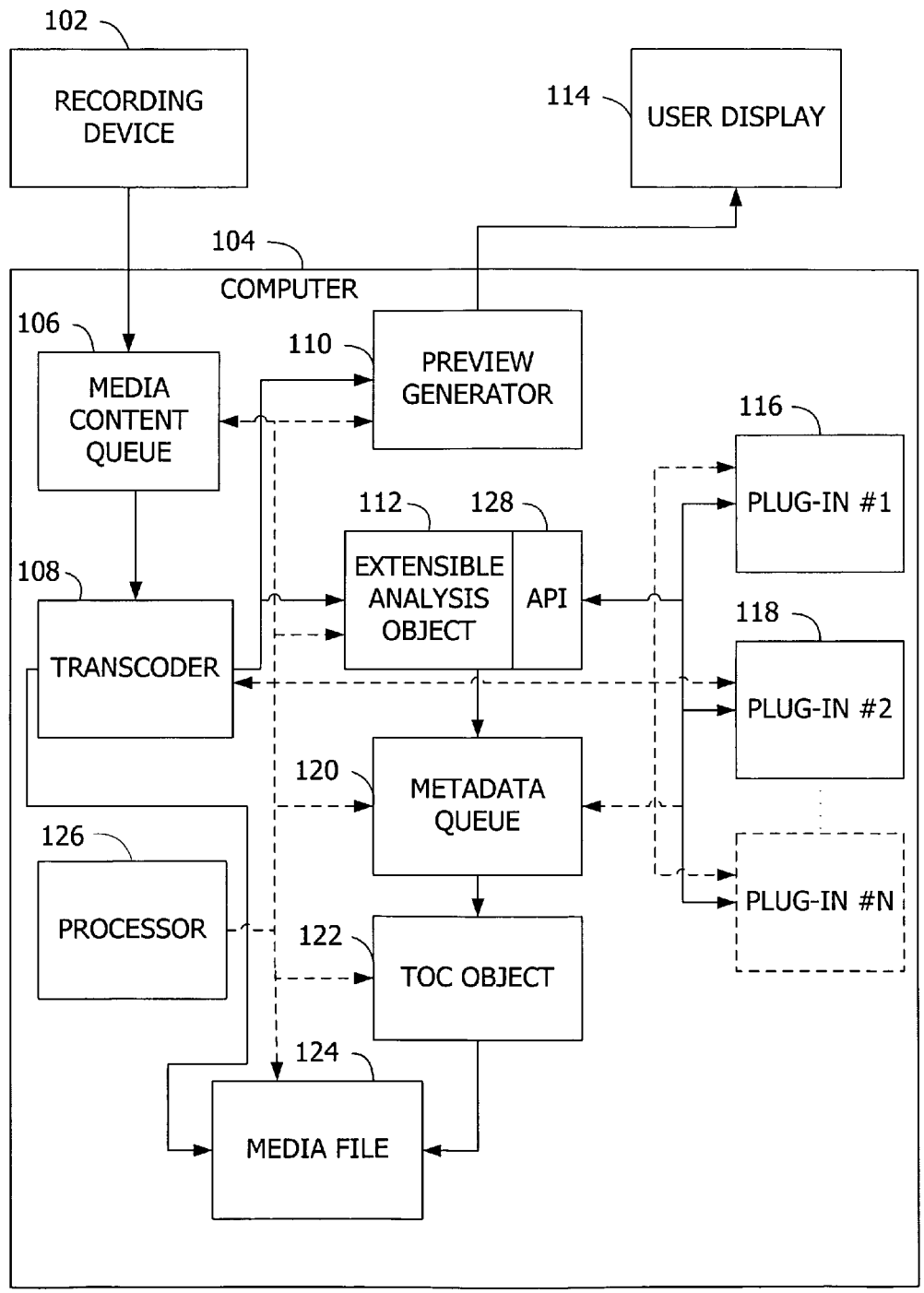
FIG. 1 is a block diagram of a system for capturing media content from a recording device to a computer according to one embodiment of the invention.

Referring now to FIG. 1, a system for capturing media content from a recording device to a computer according to one embodiment of the invention is shown. The recording device 102 provides media content such as video, audio, photographs, or a combination thereof to the computer 104. The recording device 102 may provide the media content in any format by any method. For example, the recording device 102 may stream the media content to the computer 104, or it may render the media content for the computer 104. The recording device 102 may provide the media content via a wired connection or a wireless connection to the computer 104, and it may provide the media content at any speed. Alternatively, a computing device may transmit data representative of the media content to the computer 104. The media content may be in DV-AVI format, MPEG-2 format, or any other format. Regardless of how the media content is provided to the computer 104 and the format of the media content, the computer 104 stores the media content in the original format in which it is provided by the recording device 102 in a media content queue 106.

A processor 126 of the computer 104 executes computer executable instructions for storing, moving, and analyzing the media content. The computer executable instructions are represented by software objects including a transcoder 108, a preview generator 110, an extensible analysis object 112, plug-ins 116 and 118, and a table of contents (TOC) object 122. Memory objects include a media content queue 106, a media file 124 and a metadata queue 120 for storing the media content in various forms or for storing data relating to the media content as determined by the processor 126.

The media content queue 106 provides the stored media content to a transcoder 108. The transcoder 108 decodes the media content from its original format into another format. In one embodiment of the invention, the transcoder 108 decodes the media content into media information. The transcoder 108 provides the media content to an extensible analysis object 112 and optionally to a preview generator 110. The optional preview generator 110 generates a playback of the media content provided to the computer 104 by the recording device 102 on a user display 114 of the computer 104 as the media content is received to allow a user to view the media content being transferred to the computer 104. An application programming interface (API) 128 permits the extensible analysis object 112 to interface one or more of a plurality of plug-ins as selected by the user or an application. The processor 126 executes a first selected plug-in 116 which receives the media content via the extensible analysis object 112 and API 128 and examines the media content for a first characteristic. For example, the first plug-in 116 may analyze the media content for any characteristic including an audio pattern, a video pattern, a face, a color histogram, a motion vector analysis, a date stamp, a timecode, a color set, a scene change, an object, or a person's voice. The first plug-in 116 then generates first metadata relating to the first characteristic and provides it to the extensible analysis object 112 according to the API 128. If selected, a second analysis plug-in 118 receives the media content according to the API 128 and examines it for a second characteristic. The second plug-in 118 then generates second metadata relating to the second characteristic and provides it to the extensible analysis object 112 according to the API 128. The extensible analysis object 112 stores the first and second metadata in a metadata queue 120 as it is received from the plug-ins. The metadata may be stored in any order in the metadata queue 120. In an alternative embodiment of the invention, the plug-ins provide metadata directly to the metadata queue 120. In an embodiment of the invention, the media content is provided directly to all analysis objects (i.e., to the plug-ins without the need for the extensible analysis object 112) and the analysis objects store the metadata in the metadata queue 120 such that the extensible analysis object 112 may be eliminated.

In an embodiment of the invention, the transcoder 108 may provide the media content to analysis objects without decoding the media content. The analysis objects must either be capable of decoding the media content themselves, or capable of analyzing the media content in the format in which it is received.

In one embodiment of the invention, processor 126 executes a table of contents object 122 to generate a table of contents based on the metadata in the metadata queue 120. The table of contents object 122 writes the metadata and the table of contents to the media file 124. The media file 124 stores the table of contents near the beginning of the file, followed by the media content, and then the metadata. The table of contents indicates what metadata is in the file, and where it is located in the file. In an embodiment of the invention, the metadata is stored in the media file 124 without a table of contents such that the TOC object 122 is not necessary.

The media content stored in the media file 124 is provided by the transcoder 108. After the transcoder 108 has decoded the media content in the media content queue 106, it encodes the media content in a new format, or provides the media content in its original format to the media file 124. The format may be selected by the user, or by preference of the system or computer 104.

Providing the media content to the computer 104, transcoding the media content, previewing the media content, and analyzing the media content may occur simultaneously. That is, at some point all of the processes may be executing at the same time even though analyzing the media content may take longer to complete than the other processes. As the first of the media content is provided to the computer 104, transcoding begins with decoding the media content. The decoded media content is analyzed and reviewed while additional media content is being provided to the computer 104 and decoded by the transcoder 108. The media content (e.g., media information) encoded by the transcoder 108 is stored in the media file 124 along with the metadata from the metadata queue 120 and along with the TOC generated by the TOC object 122. Thus, all of the processes can occur simultaneously.

Figure 2:
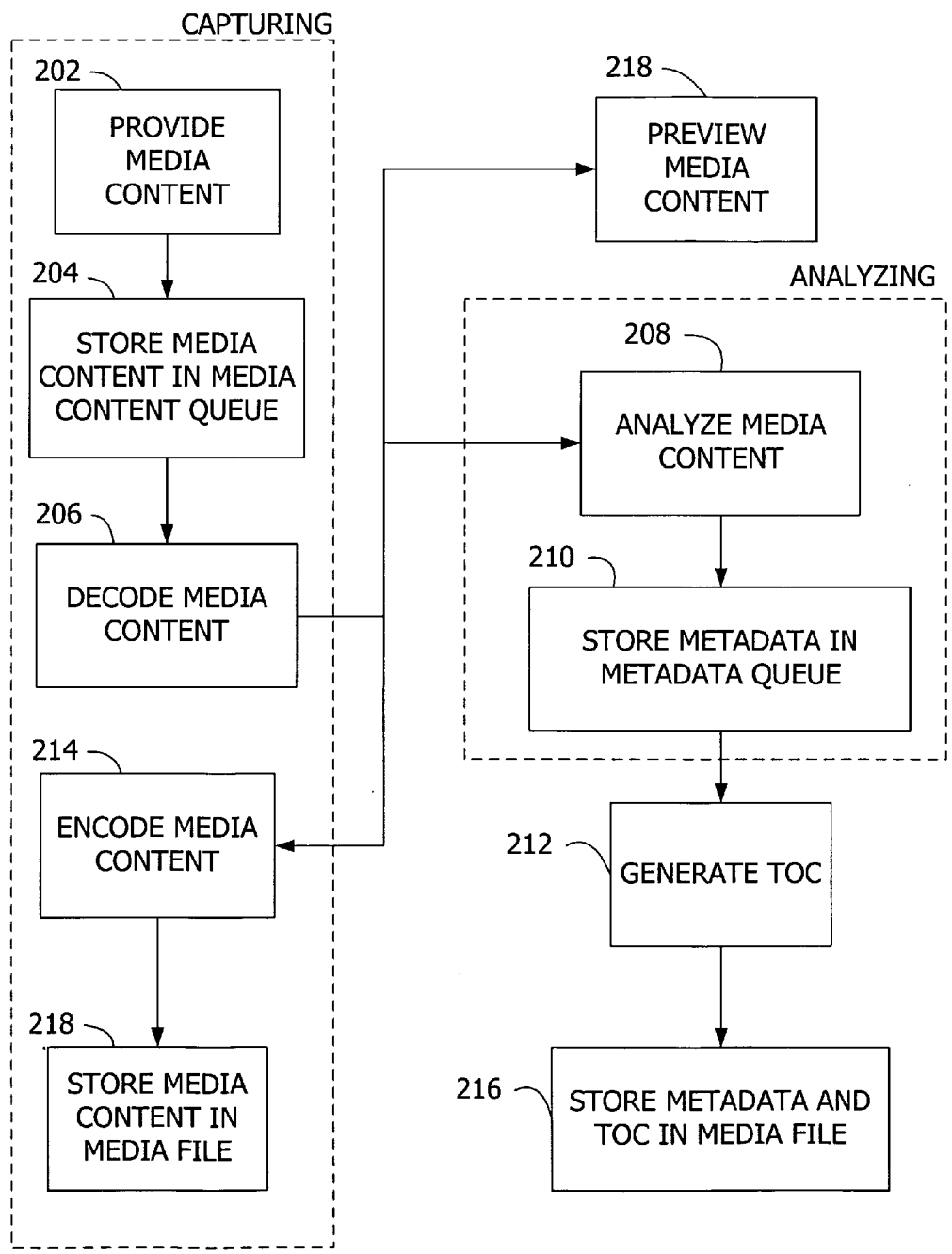
FIG. 2 is a flow chart illustrating a method for analyzing and storing media content according to one embodiment of the invention.

Referring now to FIG. 2, a method for capturing and storing media content in a computer according to one embodiment of the invention is illustrated. At 202, media content is provided to the computer 104. The media content may be provided from a recording device such as recording device 102, or any other device having media content such as a digital camera, another computer, or an audio recording device. At 204, the computer 104 stores the provided media content in a media content queue 106 in the native format in which it is received. This minimizes loss of the data provided to the computer 104 and enables performing simultaneous processes on the media content that may not be able to operate in real time. The media content is decoded from its original format to an uncompressed format by a transcoder 108 at 206, and an optional preview of the decoded content may be provided to a user on the user display 114 at 218.

At 208, the decoded media content from the queue 106 is analyzed for characteristics. Such characteristics may include an audio pattern, a video pattern, a face, a date stamp, a timecode, a color set, a scene change, an object, a color histogram, a motion vector analysis, and a person's voice. The analysis can be conducted by independent analysis objects, or by an extensible analysis object 112 which invokes one or more plug-ins 116 and/or 118 to examine the media content and generate metadata related to the media content. An example of analyzing media content for an audio pattern is analyzing a video clip for the song "Happy Birthday." If the song is detected, metadata is generated indicating that the clip includes someone's birthday. An example of analyzing media content for a video pattern is analyzing a video clip for a ball passing through a hoop which can indicate that the video was taken at a basketball game. Analyzing a video clip for a face or a person's voice allows a user to search for video clips with a particular person in them. A date stamp or timecode allow a user to organize video clips chronologically. Analyzing video for a color set or an object can tell a user that a video clip where a video clip was taken. For example, if a scene is dominated by red and green, or if a pine tree and ornaments are present, then the video probably relates to Christmas. Additional types of analysis can be added by installing additional plug-ins. The user may specify that all available types of analysis may be performed, or only some of the available analysis is to be performed. Each analysis would generate metadata indicative of the analysis. At 210, the metadata generated during analysis of the media content 208 is stored in the metadata queue 120.

After the metadata has been stored in the metadata queue 120 at 210, the table of contents (TOC) object 122 generates a table of contents based on the metadata in the metadata queue 120 at 212. The table of contents and the metadata are stored in the media file 124 at 216.

As previously mentioned, media content decoded at 206 is analyzed at 208, but the decoded media content is also encoded at 214. The media content may be encoded in the format in which it was provided to the computer 104, or may be encoded in another format. At 216, the encoded media content is stored in the media file 124 along with the table of contents and the metadata. If the media content is to be stored in its original format at 216, then one skilled in the art will recognize that encoding at 214 is not necessary as the media content stored in the media content queue 106 at 204 can be stored directly to the media file 124 at 216.

The capturing and analyzing in FIG. 2 may occur simultaneously. For example, if a 1 hour long video clip is on a tape based Digital Video (DV)-camcorder, it will take approximately 1 hour to provide all of the media content to the computer 104 at 202. Initially, a first minute of the video clip can be provided to the computer 104 at 202 and stored in the media content queue 106 at 204. The first minute in the queue 106 is then decoded at 206 by the transcoder 108 while the second minute of the video clip is being stored in the media content queue 106 at 204. The uncompressed first minute of the video clip is then analyzed by the extensible analysis object 112 at 208 and encoded at 214 by the transcoder 108. One operation or execution may take more time than another, but they may be performed at least partially simultaneously. Previewing the first minute of the video clip at 218, analyzing the first minute and generating metadata at 208, and storing metadata related to the first minute at 210 may all occur at the same time as 214, encoding the media content. As the second minute of the video clip is captured and analyzed by the system, it has a similar relationship to the third minute of the video clip. It is also important to note that one series of operations or executions (i.e., the encoding of the media content versus the analyzing of the media content) of the operation may be faster or slower than another series. When both branches occur faster than the media content is provided to the computer at 202, the user experience is not significantly impacted. If the analysis takes substantially longer than the encoding, then the user experience may be impacted (i.e., the user may be required to wait to manipulate the media file until the analysis has completed).

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein includes these and other various types of computer-readable storage media when such media contain instructions or programs for implementing the steps described below in conjunction with a microprocessor or other data processor. Further, embodiments of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any embodiment of the invention. Moreover, the computing system environment should not be interpreted as having any dependency or requirement relating to any one or combination of components illustrated in the exemplary operating environment. Examples of well known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein. In operation, computer 130 executes computer-executable instructions such as those illustrated in the figures to implement embodiments of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of embodiments of the invention.

Embodiments of the invention may be implemented with computer-executable instructions. The computer-executable instructions may be organized into one or more computer-executable components or modules. Embodiments of the invention may be implemented with any number and organization of such components or modules. For example, embodiments of the invention are not limited to the specific computer-executable instructions or the specific components or modules illustrated in the figures and described herein. Other embodiments of the invention may include different computer-executable instructions or components having more or less functionality than illustrated and described herein.

When introducing elements of embodiments of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described embodiments of the invention in detail, it will be apparent that modifications and variations are possible without departing from the scope of embodiments of the invention as defined in the appended claims. As various changes could be made in the above constructions, products, and methods without departing from the scope of embodiments of the invention, it is intended that all matter contained in the above description and shown in the accompanying drawings shall be interpreted as illustrative and not in a limiting sense.

What is claimed is:

1. A method of generating metadata relating to media content comprising:
receiving the media content from a recording device and storing the media content in a media content queue of a computer said media content queue comprising a first in first out memory;
decoding the media content in the media content queue via a processor of the computer;
selecting a first one of a plurality of analysis objects to analyze media content;
analyzing the decoded media content with the first selected analysis object to generate first metadata relating to said media content, wherein said analyzing is managed by an extensible analysis object having an application programming interface interfacing with the plurality of analysis objects, and wherein the plurality of analysis objects are plug-ins analyzing the media content via the application programming interface of the extensible analysis object, wherein each of the plurality of plug-ins adds analysis functionality to the extensible analysis object;
analyzing the media content with a second one of the plurality of analysis objects to generate second metadata, wherein the first metadata and the second metadata are provided to the extensible analysis object for storing in a metadata queue of the computer;
storing the first and second metadata in the metadata queue of the computer;
encoding the decoded media content from the media content queue via the processor of the computer;
generating a table of contents corresponding to the metadata stored in the metadata queue;
storing the first and second metadata stored in the metadata queue, the table of contents, and the encoded media content as a media file on a computer readable storage medium associated with the computer.

2. The method of claim 1 wherein the table of contents is stored in a header of the media file; said method further comprising capturing the media content by storing the media content in the media content queue and by creating the media file relating to the media content stored in the media content queue and wherein the analyzing and capturing occur simultaneously.

3. A computer readable storage medium having instructions thereon for executing the method of claim 1.

4. The method of claim 1 wherein the first analysis object analyses the media content for at least one of: an audio pattern, a video pattern, a face, a color histogram, a motion vector analysis, a date stamp, a timecode, a color set, a scene change, an object, and a person's voice.

5. The method of claim 1 further comprising providing the media content to the media content queue by at least one of: (1) a recording device providing the media content to the queue by rendering said media content, and (2) a recoding device providing the media content to the queue by streaming the media content.

6. The method of claim 2 wherein all of the plurality of analysis objects are selected to analyze the media content, and said analyzing occurs in response to capturing said media content.

7. A system for generating a media file relating to media content comprising:
a computer including a processor for receiving the media content from a recording device;
a media content queue of the computer for storing the received media content;
a transcoder object executed by the processor for decoding the media content stored in the media content queue and subsequently encoding the decoded media content;
a computer readable medium associated with the computer for storing a media file corresponding to the media content stored in the media content queue; and
an extensible analysis object executed by the processor for analyzing the decoded media content from the transcoder object and generating metadata related to the media content simultaneously as the media content is received from the recording device and the media file is stored on the computer readable medium;
a plurality of plug-ins managed by the extensible analysis object for analyzing the media content and generating the metadata related to said media content, wherein at least one of the plurality of plug-ins analyzes the media content and generates metadata related to said media content slower than the media content is received at the computer from the recording device such that analyzing the media content takes longer to complete than receiving the media content from the recording device;
a metadata queue of the computer for storing the generated metadata; and
a table of contents object for generating a table of contents corresponding to the metadata stored in the metadata queue, wherein the processor stores the table of contents, the metadata stored in the metadata queue, and the encoded media content in the media file.

8. The system of claim 7 wherein:
the table of contents is stored in a header of the media file, and
the encoded media content is stored in the media file between the table of contents and the metadata.

9. The system of claim 7 wherein the extensible analysis object has an application programming interface for interfacing with the plurality of plug-ins.

10. The system of claim 7 wherein the metadata relates to at least one characteristic of the media content, said characteristic including at least one of: an audio pattern, a video pattern, a face, a color histogram, a motion vector analysis, a date stamp, a timecode, a color set, a scene change, an object, and a person's voice.

11. The system of claim 7 wherein a first plug-in of the plurality of plug-ins and a second plug-in of the plurality of plug-ins are managed by the extensible analysis object for analyzing the media content, said first plug-in generating a first metadata related to said media content and said second plug-in generating a second metadata related to said media content, and wherein the first and second metadata are stored in the media file.

12. The system of claim 7 further comprising at least one of (1) a recording device for providing the media content to the computer by rendering said media content, and (2) a recoding device for providing the media content to the computer by streaming the media content.

13. The system of claim 7 wherein the extensible analysis object invokes one or more of the plug-ins in response to receiving the media content.

14. A computer implemented system for generating metadata relating to media content comprising:
- a transcoder object for decoding the media content and subsequently encoding the decoded media content;
- a plurality of plug-ins for analyzing the media content to generate metadata relating to the media content;
- a media content queue of the computer for storing the media content as the media content is received from a recording device and for providing the stored media content to one or more of the plurality of plug-ins, wherein the transcoder object decodes the media content provided to the one or more of the plurality of plug-ins; and
- a metadata queue of the computer for receiving and storing the metadata generated by the one or more plug-ins to which the stored media content is provided;
- a computer readable storage medium of the computer for storing a media file including the metadata in the metadata queue and including the encoded media content; and
- a table of contents object for generating a table of contents corresponding to the metadata stored in the metadata queue, wherein the table of contents, the metadata stored in the metadata queue, and the encoded media content is stored in the media file.

15. The system of claim 14 wherein the table of contents is stored in a header of the media file and the media content is stored between the table of contents and the metadata.

16. The system of claim 14 further comprising an extensible analysis object having an application programming interface interfacing with the plurality of plug-ins, wherein the plurality of plug-ins are invoked by the extensible analysis object via the application programming interface, and wherein the generated metadata is provided to the extensible analysis object via the application programming interface.

17. The system of claim 14 wherein the media content is analyzed for at least one of: an audio pattern, a video pattern, a face, a color histogram, a motion vector analysis, a date stamp, a timecode, a color set, a scene change, an object, and a person's voice.

18. The system of claim 14 further comprising a device for providing the media content to the media content queue, wherein providing the media content to the media content queue and analyzing the media content to generate metadata occur simultaneously and analyzing the media content occurs in response to receiving the media content from the device.

* * * * *